May 1, 1945. H. M. PFLAGER 2,374,776
RAILWAY TRUCK STRUCTURE
Filed Aug. 21, 1942 2 Sheets-Sheet 1
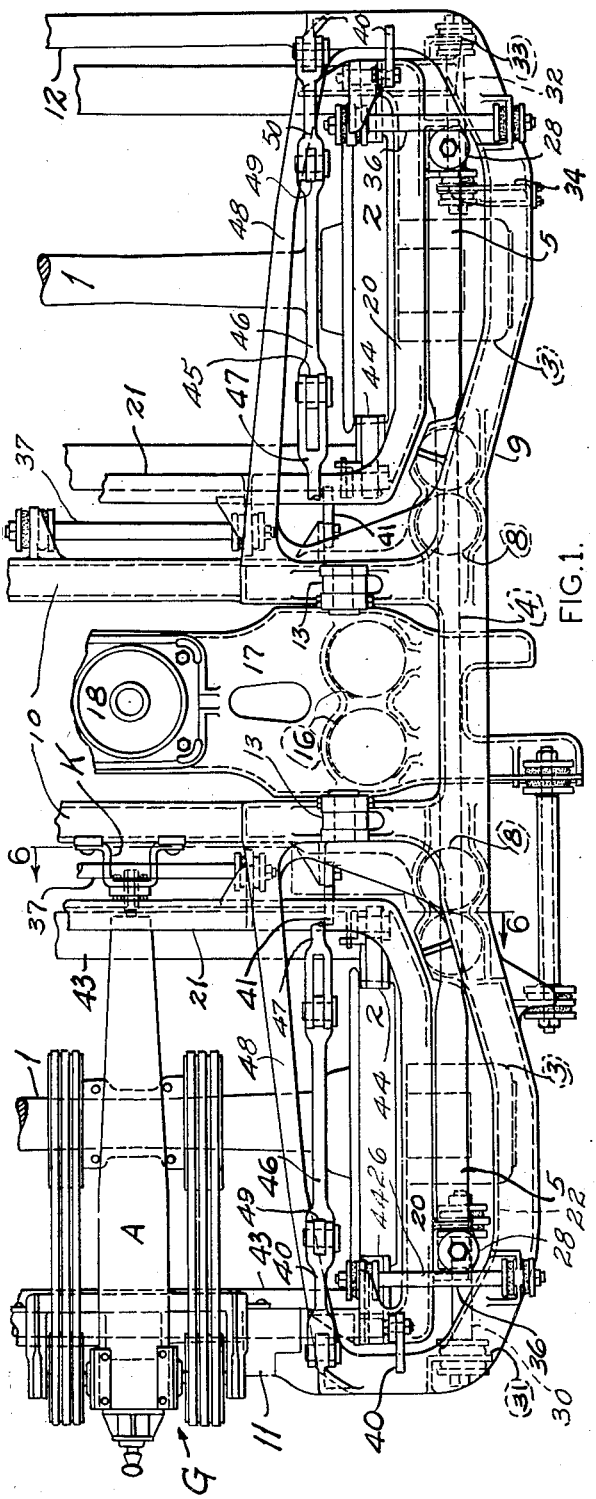
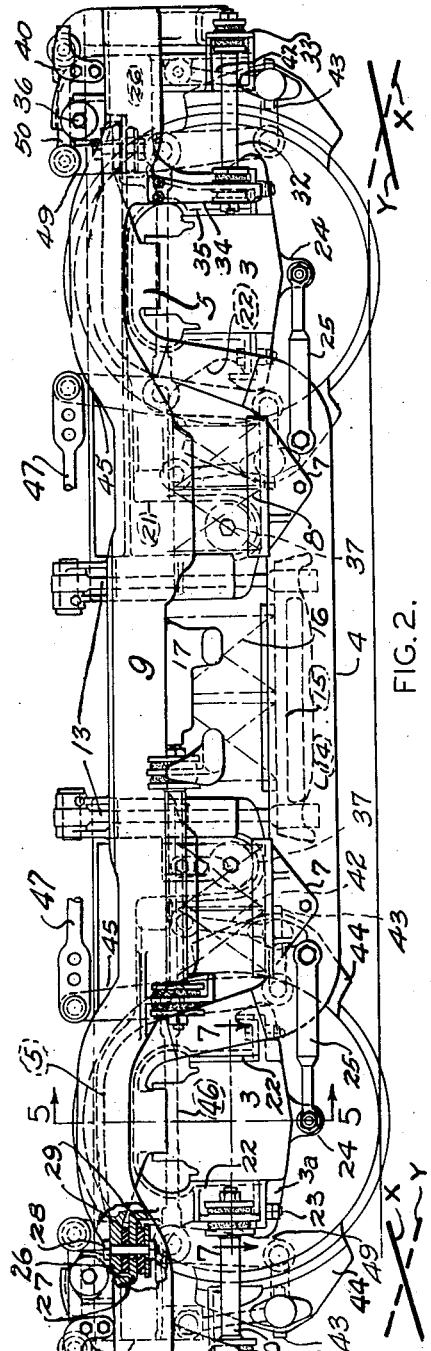
INVENTOR:
HARRY M. PFLAGER
BY *Rodney Bedell*
ATTORNEY

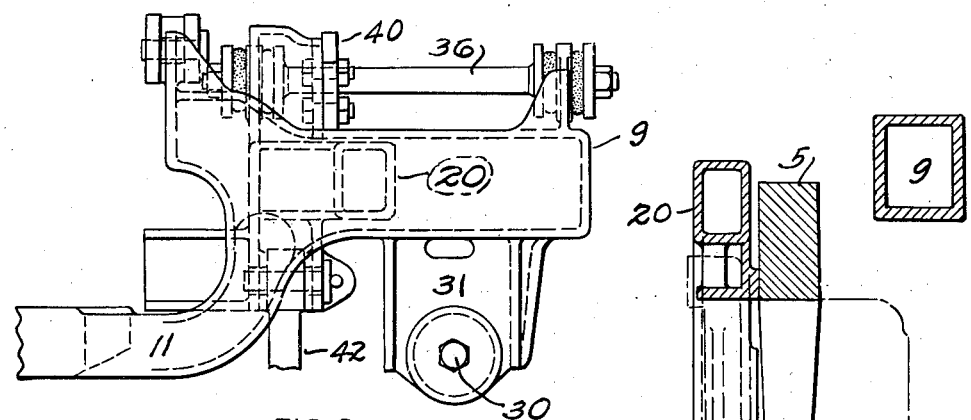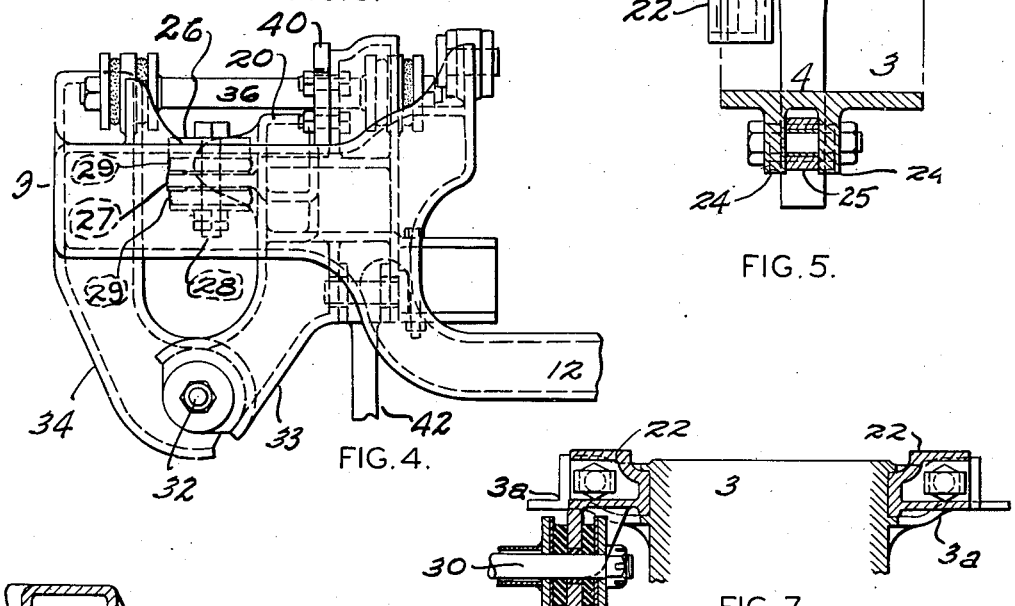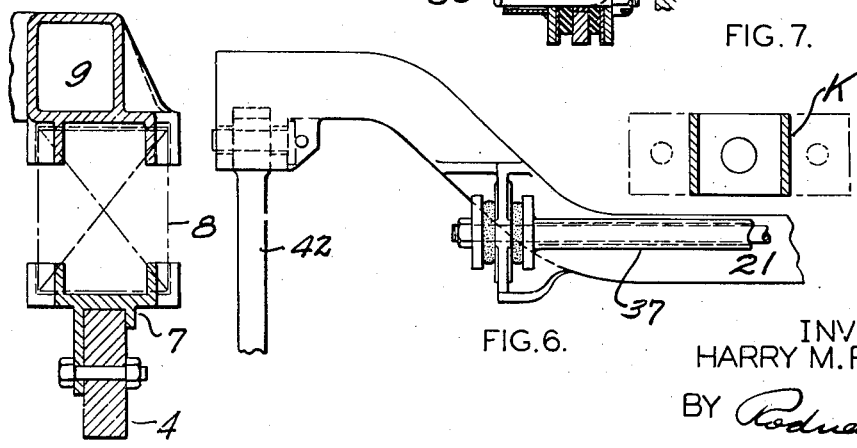

Patented May 1, 1945

2,374,776

UNITED STATES PATENT OFFICE 2,374,776

RAILWAY TRUCK STRUCTURE

Harry M. Pflager, St. Louis, Mo., assignor to General Steel Castings Corporation, Granite City, Ill., a corporation of Delaware Application August 21, 1942, Serial No. 455,562

17 Claims. (Cl. 105—194)

The invention relates to railway rolling stock and more particularly to truck structure providing for the support of brake gear from the wheeled axles independently of the truck main frame by which the vehicle body is supported.

The general objects of the invention are as follows:

To maintain a predetermined relation between the wheels and that portion of brake gear which engages the wheels.

To reduce to a minimum the transmission to the truck frame and to the vehicle body of shocks, vibrations, and forces tending to produce poor riding of the truck and arising from application of the brakes.

To accommodate relative vertical movements of the truck frame and the structure which carries that portion of the brake gear which engages the wheels, while maintaining their relative positions longitudinally and transversely of the truck; to avoid tilting of such structure by the vertical movements of the truck frame, relative to the wheels and axles, due to the action of its supporting springs.

To eliminate sliding contact between the truck frame and the boxes so as to prevent wear and binding effects between them.

To insulate the truck from rail, wheel, and joint noises by preventing continuous metal to metal contact between the truck frame and journal boxes.

These objectives correspond generally to those of the inventions disclosed in H. M. Pflager Patents Nos. 2,276,336 and 2,276,337, issued March 17, 1942, and an application by the same inventor filed March 16, 1942, Serial No. 434,898, and in an application filed July 4, 1942, Serial No. 449,792, in the names of C. F. Frede and E. C. Jackson.

More specific objects of the present invention are as follows:

To mount the equalizer and the brake gear carrying frame on the journal boxes independently of each other so as to facilitate assembly of these two truck parts and the other truck parts which are associated with them. This is accomplished by arranging the parts so that the equalizer and brake gear carrying frame can be applied vertically without interference of brackets on either part.

To connect the brake gear carrying frame to the journal box and equalizer in such manner that the depressed portion of the equalizer is permitted to swing laterally. This is accomplished by having the end portion of the equalizer, which rests on the box, extend outwardly beyond the box toward the end of the truck and connecting the end of the outwardly extending portion to the brake gear carrying frame at a point spaced outwardly from the box instead of having the brake frame connected to the equalizer at a point adjacent to the depressed portion of the equalizer as in the above-mentioned Frede et al. application, Serial No. 449,792.

To arrange the journal box, the brake gear carrying frame, and the equalizers so that they will constitute a substantially rigid unit to resist braking forces and other forces which may tend to rotate them in the same direction as to the rotation of the axle but providing for assembly of the box with the brake gear carrying frame and equalizers so that the box can be readily dropped from the truck when changing wheels and axles without removal of the equalizers, brake gear carrying frame, and other parts from the truck. This is accomplished by fitting the journal boxes in downwardly extending brackets on the brake gear carrying frame and providing brackets on the boxes to bolt the boxes to the brackets on the brake gear carrying frame and by providing a longitudinally extending tie member connected at one of its ends to the depressed portion of the equalizer and its other end to a downwardly extending lug on the journal box and by further providing a safety rubber insulated connection between the outwardly extending top portion of the equalizer and a bracket on the brake gear carrying frame.

To provide longitudinal anchor rods between the brake gear carrying frame and the truck frame in such position that longitudinal forces acting between the brake gear carrying frame and the truck frame are in horizontal alignment with the axle center so that such forces are not eccentric with the axle centers to produce additional strains on the parts which are subject to the revolving forces about the axle centers due to brake application; and to improve accessibility of this longitudinal anchor rod. This is accomplished by locating the anchor rods in a horizontal position at the same level as the axle center and connecting one end of one of the rods at one end of the truck to an outer downwardly extending bracket on the brake gear carrying frame adjacent to and engaging the side of the box and connecting the other end of the anchor to an outwardly spaced bracket on the truck frame. At the other end of the truck the relation of the brackets longitudinally of the truck are reversed and the downwardly extending bracket on the truck frame is located adjacent to the side of the journal box while the other bracket on the brake gear carrying frame is located at a point spaced outwardly from the journal box and truck frame bracket, this bracket on the truck frame being made separate so as to permit assembly of the truck frame in a vertical direction without interference with the equalizer. With this arrangement, the two anchor rods on the sides of the truck are inclined in the same direction when there is relative vertical movement of the truck frame relative to the brake gear carrying frame, and this will eliminate any binding or toggle-joint effect that would be present if the brackets on the brake gear carrying frame and the truck frame, to which the anchors are connected, were made symmetrical with each other on both ends of the truck, which toggle-joint effect would put an undue strain on the anchors and the parts to which they are connected. As shown in the above-mentioned Frede et al. application, Serial No. 449,792, the longitudinal anchor rod between the brake gear carrying frame and truck frame is located above the journal box and equalizer, and the truck frame must be offset outwardly sufficiently to accommodate the anchor.

To provide an axle guard so as to resist brake forces which otherwise would have to be resisted entirely by the sides of the truck frame, and thus providing a lighter and better truck frame construction.

To support the entire generator drive mechanism on the truck frame by mounting it on the end transom and connecting the torque arm to the center transom of the truck frame instead of to the cross member of the brake gear carrying frame as in previous arrangements. This will eliminate any undue tilting of the generator drive mechanism when there is relative vertical movement of the brake gear carrying frame and the truck frame.

These and other detail objects as will appear from the following description are attained by the structure illustrated in the accompanying drawings in which—

Figure 1 is a top view of one longitudinal half of a four-wheel truck.

Figure 2 is a side elevation of the structure shown in Figure 1 with a portion sectioned vertically to illustrate details of the construction.

Figure 3 is an end elevation of the corner of the truck at the left hand end of Figures 1 and 2.

Figure 4 is an end elevation of the corner of the truck at the right hand end of Figures 1 and 2.

Figure 5 is a vertical transverse section taken on the corresponding section line of Figure 2.

Figure 6 is a vertical transverse section taken on the corresponding section line of Figure 1.

Figure 7 is a detailed horizontal section taken on the corresponding section line of Figure 2.

Axles 1 are mounted on wheels 2 and carry journal boxes 3 in the usual manner. A drop equalizer 4 extends between journal boxes 3 at the same side of the truck with each of its elevated end portions 5 supported on the corresponding journal box.

Spring seats 7 secured to the lower intermediate portion of each equalizer 4 mount the usual coil springs 8 which support the truck main frame which includes wheel pieces 9, center transverse transoms 10 and end transverse transoms 11 and 12, all the transoms extending between and connected to the wheel pieces on opposite sides of the truck, and axle guards 48 extending between the transoms 11 and 12 at each end of the truck.

Swing hangers 13 suspended from transoms 10 at each side of the truck carry a cross bar 14 which supports the spring plank 15 and the springs 16 on which rests the bolster 17 provided with a center plate 18 mounting one end of the vehicle body in the usual manner.

All of the above described structure corresponds generally to truck arrangements in general use and long familiar in the art except that it has been customary to provide the truck frame with pedestals slidably receiving the journal boxes whereby the truck frame spaces the axles longitudinally of the truck. In the present structure the axles are spaced longitudinally of the truck by brake frames separate from the truck frame but anchored thereto and described below.

An individual brake gear carrying frame is provided for each axle and preferably is of U shape with its legs 20 extending longitudinally of the truck and resting directly upon the journal boxes (Figure 5) and with its cross bar 21 extending transversely of the truck alongside of but free of direct contact with the adjacent transverse transom 10. Depending from each leg 20 of each brake gear carrying frame (which to avoid unnecessary verbiage may be referred to as the "brake frame") are brackets 22 receiving between them the journal box 3, the lower portion of which is provided with upwardly facing jaws 3a receiving the lower ends of brackets 22 and secured thereto by bolts 23. Jaws 24 depend from the bottom of box 3 and a tie rod 25 has its ends connected to jaws 24 and the lower portion of equalizer 4. If desired, the tie rod 25 could be connected to extensions on the brake frame to which the box is securely held by the brackets 22 instead of to jaws 24 on the box.

Preferably the elevated end portion 5 of the equalizer extends outwardly from journal box 3 and terminates in a lip 26, and the adjacent brake frame member 20 has a web 27 extending under lip 26. These parts are secured to each other by a bolt 28 and preferably cushions 29 of rubber-like material are placed between elements 26 and 27 and their holding bolt. If desired, however, the web 27 may extend over the lip 26, in which case the equalizers must be mounted on the journal box before the brake frame if it is desired to apply the parts vertically without interference with the bracket or web 27.

With this arrangement the wheeled axle with its journal boxes, the equalizers and the brake frame move as a unit and the opposing faces of the box and the brake frame brackets hold these parts against relative tilting in their longitudinal vertical plane. Even if the tie rod 25 should fail, the relation of the parts will be maintained by the elements 26 and 27 which function as a safety device as well as cooperating with tie rod 25 to hold the box, brake frame and equalizer against tilting in a longitudinal vertical plane.

To maintain the desired relation between the truck frame and brake frame longitudinally of the truck, each brake frame leg is secured to the adjacent portion of the truck frame by an anchoring device.

One of these anchoring devices 30 is shown at the left hand end of the truck with its opposite ends secured respectively to the outermost bracket 22 of the brake frame and to a cooperating bracket 31 depending from the end of the truck frame (Figure 3). This anchoring device is of the type now well-known in the art and disclosed in detail in V. L. Green Reissue Patent 21,987, issued December 30, 1941. It resists substantial movement of the parts longitudinally of its axis or lengthwise of the truck while yielding to accommodate relative movement of the connected parts transversely of its axis or, more particularly, vertically of the truck.

A similar arrangement may be provided at the opposite end of the truck but preferably the relation between the brake frame bracket and the truck frame bracket is reversed so that the outer end of the anchoring device 32 is secured to a depending bracket 33 provided on the adjacent brake frame for that particular purpose. The inner end of device 32 is secured to a bracket 34 bolted to the truck frame and depending from the truck frame alongside of the adjacent box engaging bracket 35 (see Figure 4). Bracket 34 is made separate so that the truck frame may be applied vertically in the truck without interference with the equalizer. After the truck frame is in position, the bracket 34 is bolted to the truck frame as indicated.

This construction permits the truck frame to move freely vertically relative to the brake frames without undue strain on the anchor rods since both anchor rods will be inclined in the same direction when such vertical movement takes place, as indicated by the lines X and Y in Figure 2. If the brackets on the truck frame and the brake frame at one end of the truck were symmetrical with those at the other end of the truck, the anchor rods would incline in different directions tending to shorten the distance between the interconnected parts, and there would be considerable strains transmitted to the anchor rods, tie rods between box and equalizer, and other connections between the equalizer and brake frame.

If desired, a single longitudinal anchor rod between one brake frame and the truck frame may be provided at each side of the truck to hold the truck frame against movement longitudinally of the truck relative to that brake frame, in which case the equalizer, with the single tie rod, 30 or 32, connecting it to one brake frame, and the connection 25, 26, 27, 28 at the other end of the truck would hold the truck frame and both brake frames and the axles against relative movement longitudinally of the truck.

This general arrangement for mounting the equalizers and brake frame on the journal boxes and connecting the brake frame to the truck frame by anchor rods, as shown on the drawings, prevents sliding of the wheel backwards and forwards at contact point of rail since the brake frame is not pivotally connected to the truck frame to swing in a longitudinally vertical plane and there is no tendency for the brake frame to rotate about the axle and to pull the brake shoe around the periphery of the wheel as would be the case if the brake frame were pivoted to the truck frame permitting the outer end of the brake frame to move vertically relative to the truck frame while the end at the pivotal connection would always remain at the same height as the adjacent portion of the truck frame and move with it.

Similar anchoring devices 36 are disposed transversely of the truck and connect the outer ends of each brake frame with the adjacent portion of the truck frame. This arrangement has been used previously in similar types of trucks. Another anchoring device 37 extends transversely of the truck with its opposite ends secured to the transverse member 21 of the brake frame and to the adjacent truck frame center transom. These anchoring devices 36 and 37 hold the brake frame and truck frame against substantial movement transversely of the truck while accommodating their relative vertical movement.

In the above-mentioned patents and applications the end of the equalizer rests upon a flange of the brake frame extending over the journal box. With the present arrangement these parts are supported on the journal box independently of each other and this facilitates the assembly of the brake frame, equalizer, equalizer springs, etc.

The brake frames, equalizers, equalizer spring seats, equalizer coil springs, and truck frame may be assembled in the truck in a vertical direction in the order named without interference with any brackets on either of the parts. This arrangement also simplifies the construction of that portion of the brake frame which seats on the journal box as it is not necessary to provide a bracket to support the equalizer as in previous arrangements, which bracket would require accurate machining operations. In the previous arrangements, a good fit is required between the bracket and the equalizer seat and between the bracket and the journal box seat to prevent relative longitudinal movement between the parts, but in the present arrangement, it is only necessary to provide an accurate fit between the equalizer and journal box to prevent longitudinal displacement of these parts due to longitudinal forces transmitted between them.

Separately formed lugs 40 on the ends of the brake frame extend over the truck frame end transom and similar lugs 41 on the truck frame extend beneath the cross bar of the brake frame. These lugs provide a support for the brake frame on the truck frame during assembly or if the wheels are dropped when the car is shopped.

A generator drive structure is shown at G with the outer end of its support arm A carried on the truck frame end transom 11 and with its inner end connected to a truck frame center transom 10 by a yoke K independently of the brake frame cross bar 21 which extends over arm A (Figure 6). This is readily arranged since the brake frame is not pivoted to the truck frame transom as in the above-mentioned H. M. Pflager patents and application and therefore the cross bar of the brake frame adjacent to the transom may be shaped to provide adequate clearance for the generator drive arm 8 and its connection to the truck frame transom.

It will be understood that the brake gear including hangers 42, beams 43, heads 44, levers 45 and 49, connection rods 46, pull rods 47, etc., are supported entirely by the brake frames, thus keeping their respective vertical relationship at all times with the wheels and axles and avoiding any tendency of vertical movement of the truck frame to oppose forces acting through the brake hangers to thereby eliminate unnecessary slippage of brake shoes on the periphery of the wheel. In other words, the relationship of the brake shoes with the horizontal center line of the wheel is maintained at all times. Each brake dead lever 49 is anchored to the adjacent end transom by a link 50. The axle guards 48 resist bending moments in the end transoms and wheel pieces when the brakes are applied.

Obviously the details of the construction may be varied without departing from the spirit of the invention, and the exclusive use of those modifications of the structure coming within the scope of the claims is contemplated.

What is claimed is:

1. In a railway truck, spaced wheeled axles, journal boxes on said axles, a brake gear carrying frame including elements mounting it on the journal boxes of one of the axles only and holding it against movement longitudinally of the truck relative to the boxes on which it is mounted, a load carrying pedestalless frame spring-supported from all of said boxes, and a longitudinally extending anchoring device connected at one end to said load carrying frame and at its other end to said brake gear carrying frame and located substantially at the level of said axles and boxes and cooperating with the brake gear carrying frame to position the load carrying frame longitudinally of the truck relative to the axles but accommodating their relative vertical movement in the truck.

2. In a railway truck, spaced wheeled axles, journal boxes on said axles, an equalizer extending between and resting upon journal boxes at the same side of the truck, said boxes and equalizer having interengaging elements to hold them against relative longitudinal movement, a load carrying frame spring-supported upon the equalizers, a brake gear carrying frame mounted upon each journal box on the same side of the truck, said brake gear carrying frames and journal boxes having interengaging elements to hold them against relative longitudinal movement in the truck, said equalizer and brake frames having portions extending from said journal boxes towards the ends of the truck and there provided with connections resisting their relative inclination in a longitudinal vertical plane, and longitudinally extending anchoring devices located substantially at the level of the axis of said axles and boxes and connected at their ends to the brake gear carrying frames and to the load carrying frame to accommodate relative vertical movement of said frames but holding said frames against substantial relative movement longitudinally of the truck.

3. In a railway truck, spaced wheeled axles, journal boxes on said axles, an equalizer extending between and resting upon journal boxes at the same side of the truck, a brake gear carrying frame mounted upon a journal box and having depending brackets opposing the sides of the box to hold the frame and box against relative tilting about the axis of the axle and box, a load carrying frame spring-supported on the equalizer, there being a bracket on the load carrying frame aligned longitudinally of the truck with said first-mentioned brackets but spaced therefrom, and an anchoring device between a bracket on the load carrying frame and the adjacent bracket on the gear carrying frame and holding the frames against substantial movement longitudinally of the truck but accommodating their relative vertical movement.

4. In a railway truck, spaced wheeled axles, journal boxes on said axles, an equalizer extending between and resting upon journal boxes at the same side of the truck, a brake gear carrying frame mounted upon a journal box and having depending brackets opposing the sides of the box to hold the frame against tilting on the box, a load carrying frame spring-supported on the equalizer, there being a bracket on the load carrying frame adjacent to the side of the box but out of contact with the box, the gear carrying frame having a bracket spaced from the bracket on the load carrying frame and longitudinally of the truck toward the end of the truck, and an anchoring device between the latter-mentioned bracket on the gear carrying frame and the bracket on the load carrying frame and holding the frames against substantial movement longitudinally of the truck but accommodating their relative vertical movement.

5. In a railway truck, spaced wheeled axles, journal boxes on said axles, an equalizer extending between and resting on journal boxes at the same side of the truck, a brake gear carrying frame mounted upon each journal box, a load carrying frame spring-supported on the equalizer, a bracket on each end portion of the load carrying frame and a cooperating bracket on the corresponding brake gear carrying frame, the cooperating brackets being aligned with each other and spaced apart longitudinally of the frame, an anchoring device connecting the cooperating brackets and holding the frames against substantial relative movement longitudinally of the truck but accommodating their relative vertical movement, the bracket on one end of the load carrying frame being nearer to the end of the truck than the cooperating bracket on the brake gear carrying frame and the bracket at the other end of the load carrying frame being farther from the end of the truck than the cooperating bracket on the brake gear carrying frame, whereby relative vertical movement of the frames causes the bracket connecting anchoring devices to tilt in the same direction.

6. In a railway truck, spaced wheeled axles, journal boxes on said axles, an equalizer extending between and resting on journal boxes at the same side of the truck, a brake gear carrying frame mounted upon each journal box, each frame having depending brackets opposing the sides of the corresponding journal box and holding the frame and box against relative tilting about the axis of the axle and box, a load carrying frame spring-supported on the equalizer and having a bracket nearer the end of the truck than the outermost bracket on the adjacent brake gear carrying frame, an anchoring device between said latter-mentioned bracket and the bracket on the load carrying frame, said load carrying frame also having a bracket at the opposite end of the truck adjacent to the outermost bracket on the corresponding brake gear carrying frame, the latter-mentioned frame also having a bracket spaced nearer the end of the truck than the latter-mentioned bracket on the load carrying frame, and an anchoring device extending between and connected to said latter-mentioned brackets on the brake gear carrying frame and the load carrying frame, said anchoring devices holding the adjacent frame brackets against substantial relative movement longitudinally of the truck but accommodating their substantial relative vertical movement.

7. In a railway truck, spaced wheeled axles, journal boxes on said axles, an equalizer extending between and resting upon journal boxes at the same side of the truck, springs seated thereon adjacent to the associated journal boxes, a load carrying frame mounted on said springs, a brake gear carrying frame mounted upon one of said journal boxes and having a portion extending from said journal box towards the adjacent end of the truck and arranged to support a brake friction member applicable to the wheel tread nearest the end of the truck, the equalizer having a portion projecting from the box towards the adjacent end of the truck, and means positioned outwardly from the wheel tread and connecting said portions to resist relative inclination of the equalizer and brake frame in a longitudinal vertical plane.

8. In a railway truck, spaced wheeled axles, journal boxes on said axles, an equalizer extending between and resting upon journal boxes at the same side of the truck, a load carrying frame spring-supported upon the equalizer, a brake gear carrying frame mounted on the journal boxes and having depending brackets opposing opposite sides of its supporting journal box to hold the box and brake gear carrying frame against relative tilting longitudinally of the truck about the axis of the axle and box, there being an anchoring device between the brake gear carrying frame and the load carrying frame and positioned longitudinally of the truck from the associated box and accommodating their relative vertical movement but holding said frames against substantial relative movement longitudinally of the truck, the equalizer and brake gear carrying frame having portions extending from the journal box towards the adjacent end of the truck and provided with a connection spaced from the box to resist relative inclination of the equalizer and brake gear carrying frame in a longitudinal vertical plane.

9. In a railway truck, a wheeled axle, journal boxes on said axles, equalizers extending longitudinally of the truck and resting upon the journal boxes, a truck load carrying frame spring-supported from the equalizers and having a transverse center transom, a brake frame of U shape with its legs extending lonigtudinally of the truck and resting upon and rigidly secured to said boxes and with its cross bar extending adjacent to said transom but unsupported thereby, and means anchoring the outer ends of the legs of the brake gear carrying frame to adjacent portions of the equalizers to hold the brake gear carrying frame and the equalizers against relative tilting about the axis of the axle and boxes.

10. In a railway truck, spaced wheeled axles, journal boxes on said axles, an equalizer extending between and resting upon journal boxes at the same side of the truck and extending longitudinally of the truck beyond one of said journal boxes, a brake gear carrying frame mounted upon said journal box independently of the equalizer and having depending brackets opposing the sides of the box to hold the frame and box against tilting relative to each other longitudinally of the truck about the axis of the axle and box, a portion of said frame underlying the outwardly extending portion of the equalizer, and a cushioned connection between said portions of said frame and equalizer and resisting inclination of the frame and equalizer in a longitudinal vertical plane.

11. In a railway truck, spaced wheeled axles, journal boxes on said axles, an equalizer extending between and resting upon journal boxes at the same side of the truck, a brake gear carrying frame mounted upon a journal box and having depending brackets opposing the sides of the box, a tie rod between the lower portion of each box and the adjacent portion of the equalizer, said brackets and tie rod holding said box, frame and equalizer against relative tilting movement about the axis of the axle and box, and a load carrying frame spring-supported upon the equalizer, there being an anchoring device extending longitudinally of the truck with its ends connected to the brake gear carrying frame and to the load carrying frame respectively and holding said frames against substantial movement longitudinally of the truck.

12. In a railway truck, spaced wheeled axles, journal boxes on said axles, a brake gear carrying frame mounted upon at least one of said journal boxes, a load carrying frame spring-supported from said box and having a wheel piece extending outwardly of the adjacent wheel and having spaced transverse transoms extending inwardly of the wheel piece at opposite sides of the wheel, the outer of said transoms having a part inwardly of the wheel arranged to fulcrum a brake lever, and an axle guard extending between said transoms and located inwardly of the wheel and connected to the outer transom adjacent said parts.

13. A truck as described in claim 12 which includes an equalizer at the side of the truck with one of its ends mounted on the journal box upon which the brake frame is mounted and in which the portion of the wheel piece adjacent to the portion of the equalizer which rests on the top of the box is located outwardly of said equalizer portion.

14. A truck as described in claim 7 which includes a tie rod between the lower portion of each journal box supporting the equalizer and the adjacent portion of the equalizer.

15. A truck as described in claim 7 in which the brake gear carrying frame has depending brackets opposing the sides of its supporting box to hold the box and the brake gear carrying frame against relative tilting about the axis of the axle and box.

16. A truck as described in claim 7 in which the equalizer has a depressed portion between the journal boxes and in which the equalizer and brake frame extensions are at a level above the level of the top of the box, there being a tie rod device between the depressed portion of the equalizer and the bottom of the corresponding box to assist in resisting relative inclination of the equalizer and brake frame in a longitudinal vertical plane.

17. In a railway truck, spaced wheeled axles, journal boxes on said axles, a brake gear carrying frame including elements mounting it on the journal boxes of one of the axles and holding the frame against movement longitudinally of the truck relative to the boxes on which it is mounted, an equalizer extending between and resting upon journal boxes at the same side of the truck, a load carrying frame spring-supported from said equalizer, and a longitudinally extending anchoring device connected at one end to said load carrying frame and at its other end to said brake gear carrying frame and located substantially at the level of the axles and boxes to hold the frames against relative movement longitudinally of the truck but accommodating their relative vertical movement in the truck, the equalizer and its supporting boxes having interengaging means at each seat for the equalizer on the boxes to hold the journal boxes on each side of the truck in longitudinally spaced relation in the truck, whereby longitudinal forces acting between the boxes on the same side of the truck are transmitted through the equalizer and then through the boxes to the brake gear carrying frame and then through the anchoring device to the load carrying frame.

H. M. PFLAGER.